(12) United States Patent
Nakagawa et al.

(10) Patent No.: US 6,311,814 B1
(45) Date of Patent: Nov. 6, 2001

(54) ONE-WAY CLUTCH

(75) Inventors: Yoshitaka Nakagawa; Hajime Tazumi, both of Osaka; Tadahiro Terada; Hideki Fujiwara, both of Nara, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/499,590

(22) Filed: Feb. 7, 2000

(30) Foreign Application Priority Data

Mar. 29, 1999 (JP) .................................................. 11-086043

(51) Int. Cl.$^7$ .................................................. F16D 41/067
(52) U.S. Cl. .................................................. 192/45
(58) Field of Search .................................................. 192/45

(56) References Cited

U.S. PATENT DOCUMENTS

| | | |
|---|---|---|
| 4,909,366 | 3/1990 | Tanaka . |
| 4,987,984 | 1/1991 | McCreary . |
| 5,482,144 | 1/1996 | Vranish . |
| 5,676,225 | 10/1997 | Miyata . |
| 5,927,456 | * 7/1999 | Monahan et al. .................. 192/45 X |
| 6,116,393 | * 9/2000 | Ooitsu et al. .......................... 192/45 |

FOREIGN PATENT DOCUMENTS

| | | |
|---|---|---|
| 2582761 | 12/1986 | (FR) . |
| 10-238561 | * 9/1998 | (JP) . |

OTHER PUBLICATIONS

Abstract of Japanese Appln. No.: 03249435, 11/91, Yoshiaki.

* cited by examiner

*Primary Examiner*—Rodney H. Bonck
(74) *Attorney, Agent, or Firm*—Jordan and Hamburg LLP

(57) ABSTRACT

A one-way clutch has rollers individually disposed in wedge-shaped spaces formed at positions along a circumference between an inner annular body and an outer annular body which are disposed concentrically. The wedge angle of each wedge-shaped space is fixed at a preferred value. As a result, an engagement position of the roller becomes shallow when the roller is positioned on a narrower side of the wedge-shaped space and gaps between the roller and the inner and outer annular bodies become small when the roller is positioned on a wider side of the wedge-shaped space. Therefore, the rollers move smoothly when switching between the lock state and the free state.

3 Claims, 4 Drawing Sheets

F I G. 5
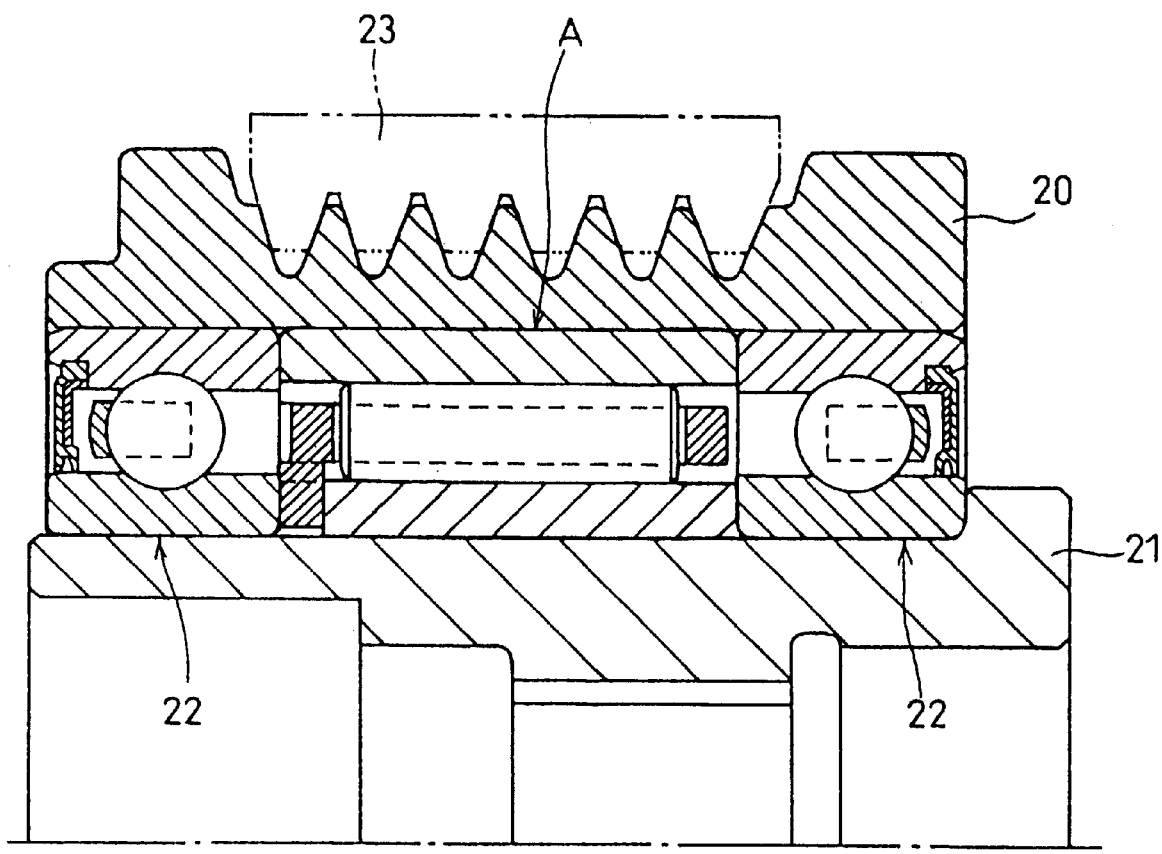

ONE-WAY CLUTCH

BACKGROUND OF THE INVENTION

The present invention relates to a one-way clutch of a type employing rollers. This one-way clutch is built into a pulley mounted to auxiliary machinery driven by a crankshaft of an engine of an automobile or the like through a belt, for example.

A conventional one-way clutch of this type is described. An inner annular body and an outer annular body are disposed inside and outside each other in a diameter direction and concentrically with each other. Wedge-shaped spaces each with a gap in a diameter direction narrowing in one direction in a circumferential direction are formed at some positions on a circumference in a gap through which both the annular bodies face each other. A roller is individually disposed in each wedge-shaped space. Between both the annular bodies, a cage having pockets extending to open inside and outside in a diameter direction at positions in phase with the wedge-shaped spaces is provided. Each roller is individually housed by each corresponding pocket. An elastic member is housed by each pocket. Each roller is elastically biased by each elastic member toward a narrower side (lock side) in one direction in the circumferential direction in the wedge-shaped space.

The wedge-shaped spaces are formed by providing cam faces to one of the annular bodies (an outer peripheral face of the inner annular body or an inner peripheral face of the outer annular body) and a wedge angle of the wedge-shaped space is generally set at 9° to 11°.

The wedge angle is an angle ($\alpha$, $\beta$ which will be described later) at which two tangents intersect each other, one of the tangents being a tangent at a point of contact at which the roller contacts the outer peripheral face of the inner annular body and the other of the tangents being a tangent at a point of contact at which the roller contacts the inner peripheral face of the outer annular body when the roller rolls to the lock side.

In the above structure of the one-way clutch, when each roller rolls to the narrower side in one direction in the circumferential direction of the wedge-shaped space, the clutch is brought into a lock state in which the inner annular body and the outer annular body are integrated with each other through the rollers and rotate synchronously. When each roller rolls to a wider side in the other direction in the circumferential direction of the wedge-shaped space, the clutch is brought into a free state in which the inner annular body and the outer annular body rotate with respect to each other. In this manner, depending on a position in the wedge-shaped space to which each roller rolls, the clutch is switched between the lock state and the free state. In conventional clutches having the above wedge angle, a lock malfunction may occur and a response property of a clutch operation is degraded when the roller rolls to the narrower side of the wedge-shaped space to bring the clutch into the lock state.

SUMMARY OF THE INVENTION

Therefore, it is a main object of the present invention to provide a one-way clutch in which generation of a lock malfunction is prevented and a response property of a clutch operation is improved.

It is another object of the invention to provide a one-way clutch in which a wedge angle of each wedge-shaped space is set at a proper value, switching between a lock state and a free state is made smooth, and the response property of the clutch operation is improved.

Other objects, features, and advantages of the invention will become apparent from the following descriptions.

According to the invention, there is provided a one-way clutch including an inner annular body, an outer annular body which is disposed outside the inner annular body and concentrically with the inner annular body and constitutes wedge-shaped spaces at some positions in a circumferential direction between the inner annular body and the outer annular body, each wedge-shaped space being narrowing in one direction in the circumferential direction, and a plurality of rollers each disposed in each wedge-shaped space for switching between a lock state in which each roller rolls to a narrower side of the wedge-shaped space to integrate both the annular bodies with each other to allow both the annular bodies to rotate synchronously and a free state in which each roller rolls to a wider side of the wedge-shaped space to cancel the lock state to allow both the annular bodies to rotate with respect to each other, wherein the inner annular body and the outer annular body have a structure in which a wedge angle of each wedge-shaped space is set at 4° to 8°.

If the wedge angle of the wedge-shaped space is set at the above value, an engagement position of each roller is at a position in the wedge-shaped space with the narrowest wedge angle and is relatively shallow when the roller is positioned on the narrower side of the wedge-shaped space and gaps between each roller and both the annular bodies are relatively small when the roller is positioned on the wider side of the wedge-shaped space. Therefore, the rollers move smoothly in switching between the lock state and the free state.

BRIEF DESCRIPTION OF THE DRAWINGS

These and other objects as well as advantages of the invention will become clear by the following description of preferred embodiments of the invention with reference to the accompanying drawings, wherein:

FIG. 5 is a sectional view of an upper half of a pulley unit for which the one-way clutch of the invention is used.

In all these figures, like components are indicated by the same numerals.

DETAILED DESCRIPTION OF THE INVENTION

Figure 1:
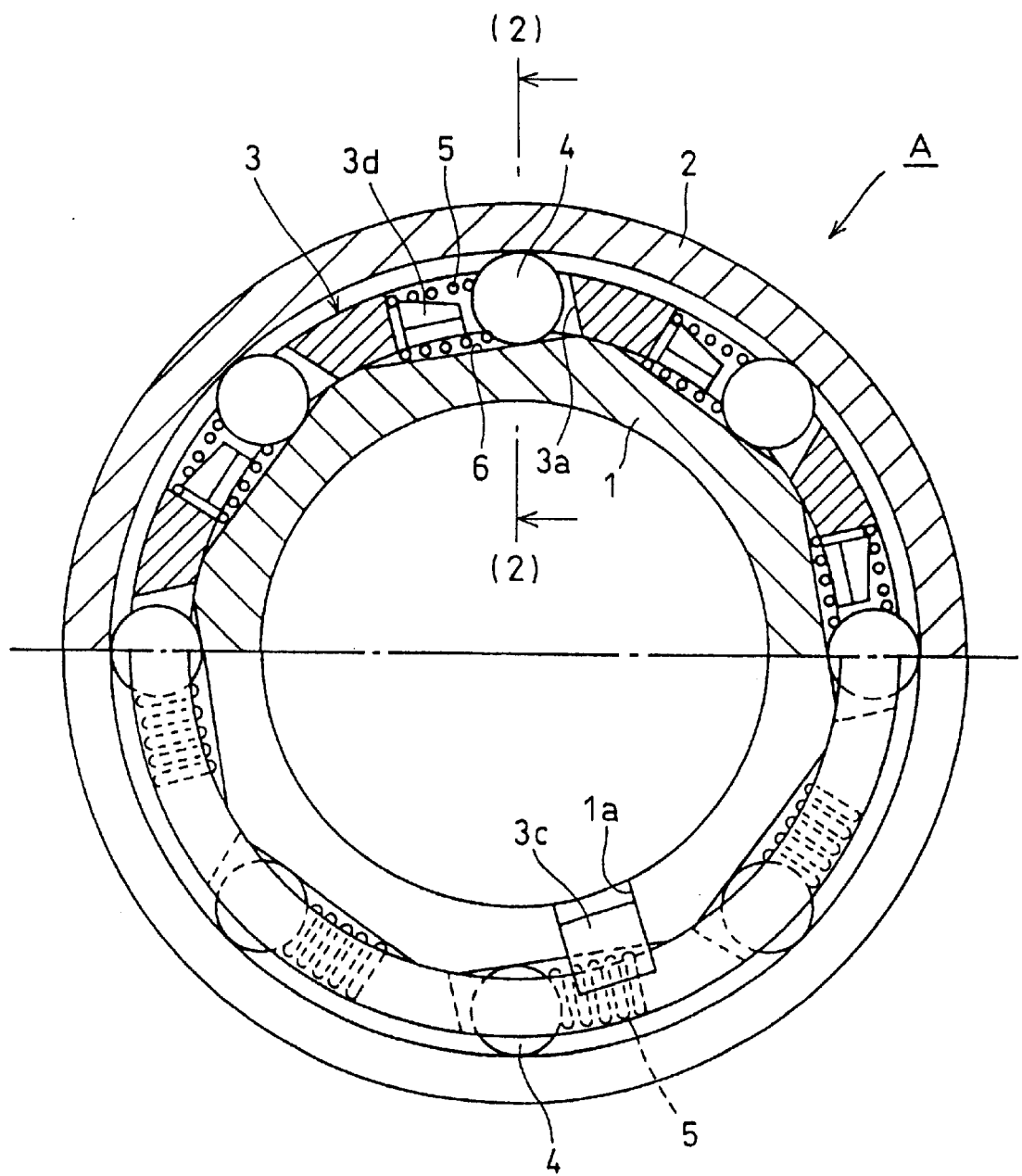
FIG. 1 is a sectional side view of an upper half of a one-way clutch according to a preferred embodiment of the present invention.
Figure 2:
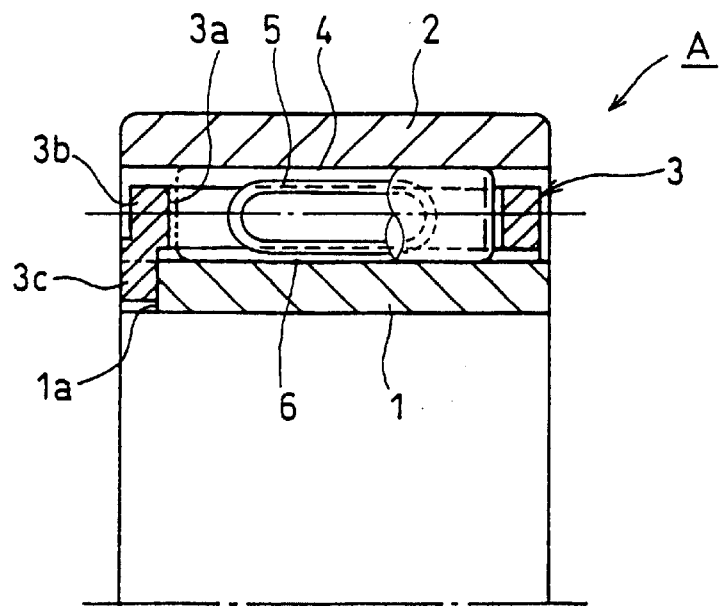
FIG. 2 is a sectional view taken along a line (2)—(2) and in a direction shown by arrows in FIG. 1.
Figure 3:
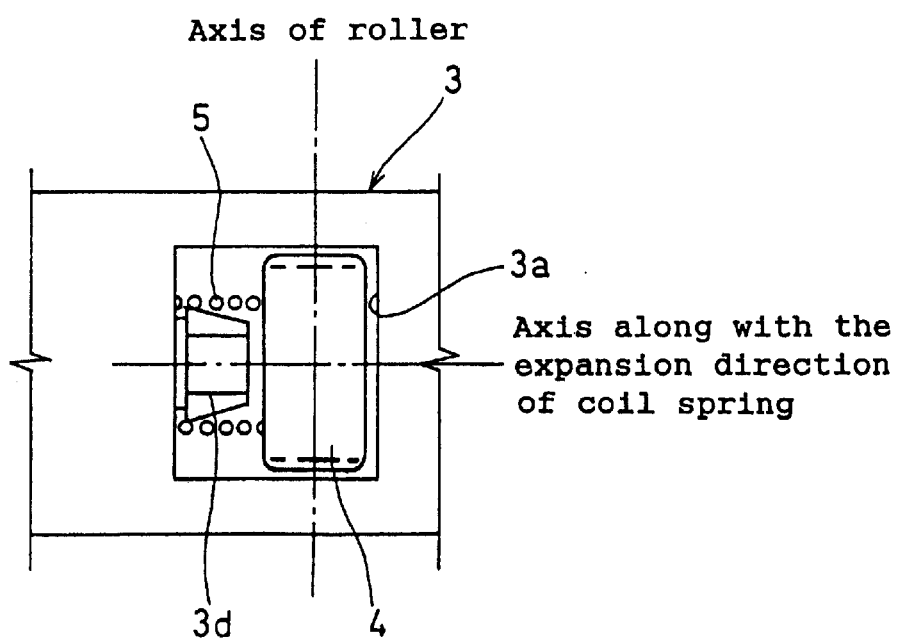
FIG. 3 is a plan developed view of a pocket portion of a cage in FIG. 1.

A one-way clutch according to a preferred embodiment of the present invention will be described below with reference to FIGS. 1 to 4.

The one-way clutch A has, as its components, an inner ring 1, an outer ring 2, a cage 3, rollers 4, and coil springs 5 as elastic members. The roller 4 rolls to a narrower side (lock side) or a wider side (free side) in a wedge-shaped space described later according to a rotation difference between the inner ring 1 and the outer ring 2.

If the roller 4 rolls to the lock side, the inner ring 1 and the outer ring 2 are brought into a lock state in which the inner ring 1 and the outer ring 2 are integrated with each other through the roller 4 and rotate synchronously and power is transmitted.

If the roller 4 rolls to the free side, the lock state of the inner ring 1 and the outer ring 2 is canceled and the inner ring 1 and the outer ring 2 are brought into a free state in which the inner ring 1 and the outer ring 2 rotate with respect to each other and power transmission is interrupted. In this manner, the inner and outer rings are switched between the lock state and the free state depending on the position to which the roller 4 rolls.

The components of the one-way clutch A will be described below in detail.

The inner ring 1 is provided with cam faces 6 constructed of flat key-shaped notches at some positions along a circumferential direction of an inner peripheral face. At two positions facing each other through 180° on one end face of the inner ring 1, slit-shaped notches 1a, 1a are provided.

The outer ring 2 is formed to have cylindrical inner and outer peripheral faces and disposed concentrically with the inner ring 1 to face an outer periphery of the inner ring 1 through a required gap. By the inner peripheral face of the outer ring 2 and the cam faces 6 of the inner ring 1, wedge-shaped spaces are formed at some positions on a circumference in the gap through which the inner ring 1 and outer ring 2 face each other. A gap in a diameter direction of each wedge-shaped space is narrow on the lock side on one side in the circumferential direction and wide on the free side on the other side in the circumferential direction.

The cage 3 is mounted between the inner ring 1 and outer ring 2 and fitted to the outer peripheral face of the inner ring 1. The cage 3 has pockets 3a extending to open inside and outside in the diameter direction at positions corresponding to the respective cam faces 6 of the inner ring 1. To two positions facing each other through 180° on an inner peripheral face of a wall portion 3b on one side of the axial direction of the pocket 3a in the cage 3, projecting chips 3c, 3c, to be press-fitted into the notches 1a, 1a of the inner ring 1 are provided. The projecting chips 3c, 3c are fitted into the notches 1a, 1a. As a result, the cage 3 is positioned in the circumferential direction and the axial direction with respect to the inner ring 1 having the cam faces 6.

Each roller 4 is individually housed for rolling in the circumferential direction by the corresponding pocket 3a in the cage 3. In this housed state, each roller 4 is individually disposed on each wedge-shaped space formed between the corresponding cam face 6 of the inner ring 1 and the inner peripheral face of the outer ring 2.

The coil spring 5 is individually housed by the pocket 3a of the cage 3 in a compressed state. The coil spring 5 elastically biases the roller 4 toward the narrower side (lock side) in the wedge-shaped space by its extension restoring force. The coil spring 5 is fitted to an outside of a projection 3d integrally formed on an inner diameter side on one side of a side wall of a circumferential direction of an inner face of the pocket 3a in the cage 3. The coil spring 5 is arranged such that an expanding/contracting direction of the coil spring 5 is orthogonal to a rolling axis center of the roller 4 and one end of the coil spring 5 abuts on an intermediate area in the axial direction of the roller 4.

The coil spring 5 is an angularly wound spring wound to have a substantially rectangular prism in section and one end of the coil spring 5 in the expanding/contracting direction abuts on a half or more, e.g., two-thirds of a length of the roller in an axial direction at the intermediate area of the roller 4 in the axial direction.

The coil spring 5 elastically biases the roller 4 toward the inner peripheral face of the outer ring 1 substantially in a direction along the cam face 6 of the inner ring.

A wedge angle a of the wedge-shaped space in the invention is set at 4° to 8°, and preferably at 5° to 7°.

If a lower limit value of the wedge angle a is set at a value smaller than 4°, a dimensional deviation of the narrower side and the wider side of the wedge-shaped space from each other becomes too small and the roller 4 is liable to remain locked in switching from the lock state to the free state.

If an upper limit value of the wedge angle is set at a value greater than 8°, a dimensional deviation of the narrower side and the wider side of the wedge-shaped space from each other becomes too large and a lock malfunction may occur to delay the switching operation in switching from the free state to the lock state.

Figure 4:
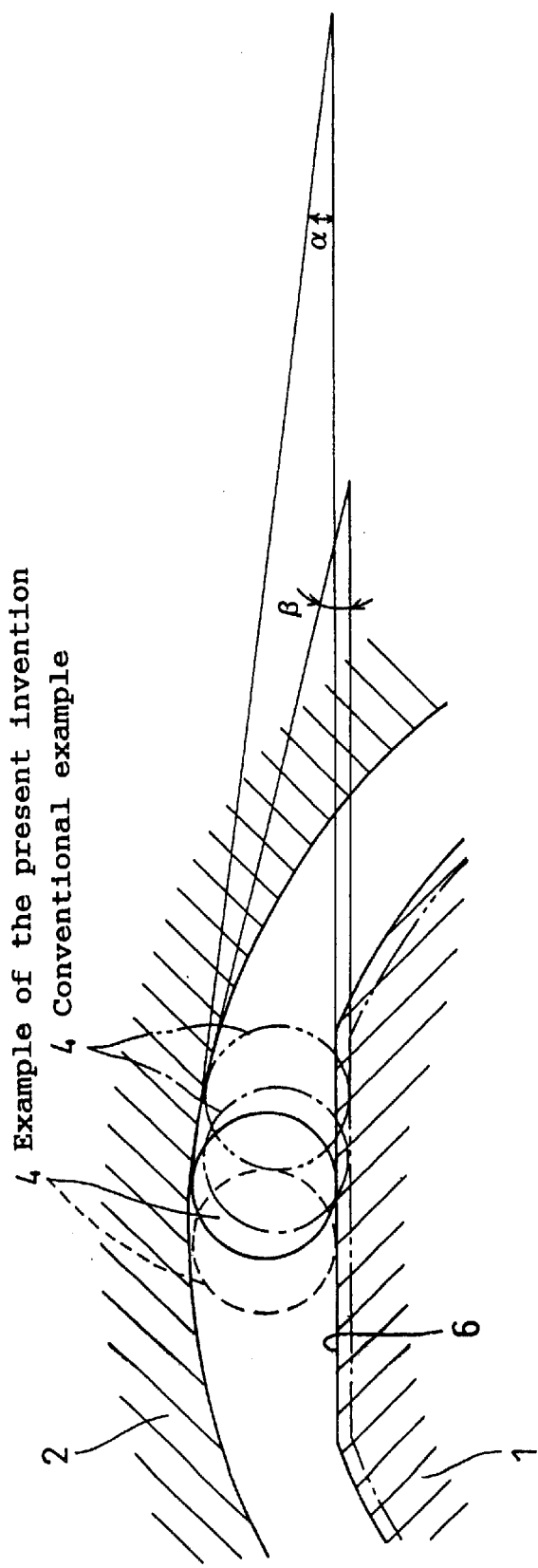
FIG. 4 is an explanatory view showing wedge angles in one wedge-shaped space in FIG. 1.

A difference between the wedge angle $\alpha$ of the invention and the wedge angle $\beta$ of prior art is shown in FIG. 4.

In FIG. 4, a solid line and a broken line respectively show the lock state (the narrower side of the wedge-shaped space) and the free state (the wider side of the wedge-shaped space) of the roller 4 in the invention.

A two-dot dashed line and a one-dot dashed line respectively show the lock state and the free state of the roller 4 in the prior art.

FIG. 4 is for facilitating understanding of the invention and shows that an engagement position of the roller 4 is shallower in the lock state and gaps between the roller 4 and the inner ring 1 and outer ring 2 are smaller in the free state in the invention as compared with the prior art.

Consequently, if the wedge angle is set at a proper value, the roller 4 can move smoothly and stably in switching between the lock state and the free state. Therefore, in the invention, switching of the state is carried out swiftly without delay. Furthermore, in the invention, because the rollers 4 move smoothly, wearing of the inner ring 1 and outer ring 2 which the rollers 4 contact is suppressed.

The invention can be similarly applied to a structure in which the similar cam faces are provided to some positions along the circumferential direction on the inner peripheral face of the outer ring 2.

In the invention, coil springs 5 each having a circular shape or a shape of an ellipse of an end face may be used.

In the invention, other elastic members such as leaf springs or Belleville springs may be used instead of the coil springs 5.

The one-way clutch A of the invention is built in the pulley mounted to auxiliary machinery driven by the crankshaft of the engine of the automobile or the like through the belt, for example. Examples of other auxiliary machinery for which the one-way clutch A of the invention can be used are a compressor for an air conditioner, a water pump, an alternator, a cooling fan, crank pulley, and the like.

To be more concrete, a case in which the one-way clutch A is incorporated into a pulley of an alternator as auxiliary machinery is shown in FIG. 5 and will be described. In this case, between the pulley 20 of the alternator and a rotor 21, the one-way clutch A of the above-described embodiment is mounted and rolling bearings 22, 22 such as deep groove ball bearings are disposed on opposite sides of the one-way clutch A in an axial direction. In this case, the one-way clutch A is switched between the free state and the lock state according to a rotation difference between the pulley 20 and the rotor 21, thereby transmitting rotation power from the pulley 20 to the rotor 21 or interrupting the transmission of the rotation power. In the alternator, because the pulley 20 is driven for rotation by the crankshaft of the engine through a belt 23, power generation efficiency of the alternator decreases conventionally if a rotation speed of the crankshaft decreases. However, if the one-way clutch A is built in, the one-way clutch A can function such that a rotation speed of the rotor 21 is kept high by an inertial force of the rotor 21 itself when a rotation speed of the pulley 20 decreases, which contributes to improvement of the power generation efficiency. Moreover, by a variation in rotation from the crankshaft and an inertial force of a rotor shaft of the alternator, it is possible to prevent shortening of life of the belt due to stress applied to the belt and generation of noise due to a slip. In such usage, by an excellent clutch function of the one-way clutch A of the invention, it is possible to stably switch between transmission of power between the pulley 20 and the rotor 21 of the alternator and interruption of the transmission and a function peculiar to the alternator using the above one-way clutch A is reliably carried out.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A one-way clutch comprising:

an inner annular body having an outer peripheral face and cam faces formed as flat notches extending chordally on said outer peripheral face;

an outer annular body having an inner peripheral face having a circular shape in section, said outer annular body being disposed outside said inner annular body and concentrically with said inner annular body;

gaps provided individually between each said cam face of said inner annular body and said inner peripheral face of said outer annular body such that each said cam face faces said inner peripheral face of said outer annular body;

wedge-shaped spaces at positions along a circumferential direction between said inner annular body and said outer annular body, each said wedge-shaped space having a wider side and a narrower side, said narrower side being narrowing in one direction along said circumferential direction; and rollers disposed individually in each said wedge-shaped space for switching between a lock state in which each said roller rolls to the narrower side of said wedge-shaped space to integrate both the inner annular body and the outer annular body with each other such that said inner annular body and the outer annular body rotate synchronously and a free state in which each said roller rolls to the wider side of said wedge-shaped space to cancel said lock state to allow the inner annular body and the outer annular body to rotate with respect to each other, wherein a wedge angle of each said wedge-shaped space is between 4° to 8°, said wedge angle being defined by the cam face and a tangent of an inner circumference of the outer annular body at a point where said roller is disposed in said wedge-shaped space in the lock state.

2. The one-way clutch according to claim 1 further comprising:

a cage disposed between the inner annular body and outer annular body having pockets corresponding to said respective wedge-shaped spaces and extending to open inside and outside in a diameter direction, each said pocket individually housing each said roller;

and elastic members each disposed individually in each said pocket for elastically biasing said roller in said pocket toward a lock side of said wedge-shaped space.

3. The one-way clutch according to claim 1 wherein the one-way clutch comprises an even number of rollers and each cam face opposes a corresponding cam face positioned at 180° across the inner annular body.

* * * * *